United States Patent
Ludewig et al.

(10) Patent No.: US 7,812,087 B2
(45) Date of Patent: Oct. 12, 2010

(54) POLYURETHANE PREPOLYMERS CONTAINING ALKOXYSILANE GROUPS AND ALLOPHANATE AND/OR BIURET GROUPS

(75) Inventors: Michael Ludewig, Köln (DE); Mathias Matner, Neuss (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 11/513,000

(22) Filed: Aug. 30, 2006

(65) Prior Publication Data

US 2007/0055010 A1 Mar. 8, 2007

(30) Foreign Application Priority Data

Sep. 3, 2005 (DE) .................. 10 2005 041 954

(51) Int. Cl.
*C08G 18/08* (2006.01)
(52) U.S. Cl. .................. 524/589; 525/38; 525/453; 528/26; 528/25; 528/28; 528/65; 528/38
(58) Field of Classification Search ............ 524/589
See application file for complete search history.

(56) References Cited

U.S. PATENT DOCUMENTS

| | | | | |
|---|---|---|---|---|
| 3,627,722 | A | | 12/1971 | Seiter ..................... 260/37 N |
| 3,632,557 | A | | 1/1972 | Brode et al. ......... 260/77.5 TB |
| 3,769,318 | A | * | 10/1973 | Windemuth et al. .......... 560/24 |
| 3,903,052 | A | * | 9/1975 | Wagner et al. ................ 528/21 |
| 4,036,813 | A | * | 7/1977 | Hardman et al. ............. 528/34 |
| 4,067,844 | A | | 1/1978 | Barron et al. ............ 260/37 N |
| 4,292,350 | A | * | 9/1981 | Kubitza et al. ........... 427/385.5 |
| 4,345,053 | A | | 8/1982 | Rizk et al. ................... 525/440 |
| 4,650,835 | A | * | 3/1987 | Eck et al. ............... 525/440.03 |
| 5,166,383 | A | * | 11/1992 | Parrinello et al. .......... 556/414 |
| 5,364,955 | A | | 11/1994 | Zwiener et al. ............. 556/418 |
| 5,663,272 | A | * | 9/1997 | Slack et al. ................... 528/69 |
| 5,747,629 | A | * | 5/1998 | Yeske et al. ................... 528/70 |
| 5,859,163 | A | * | 1/1999 | Slack et al. ................... 528/49 |
| 5,917,083 | A | * | 6/1999 | Konig et al. ................ 560/157 |
| 6,545,087 | B1 | | 4/2003 | Schmalstieg et al. .......... 525/38 |
| 6,833,423 | B2 | * | 12/2004 | Roesler et al. ................ 528/33 |
| 6,884,852 | B1 | | 4/2005 | Klauck et al. ............... 525/458 |
| 6,887,964 | B2 | * | 5/2005 | Frisch et al. .................. 528/28 |
| 2002/0169255 | A1 | * | 11/2002 | Lagneaux et al. ........... 525/100 |
| 2004/0132949 | A1 | * | 7/2004 | Roesler et al. ................ 528/28 |
| 2005/0101754 | A1 | * | 5/2005 | Slack ......................... 528/44 |
| 2005/0148754 | A1 | * | 7/2005 | Slack et al. .................. 528/48 |
| 2006/0079660 | A1 | * | 4/2006 | Ludewig et al. .............. 528/44 |
| 2006/0205911 | A1 | * | 9/2006 | Ludewig et al. .............. 528/44 |

FOREIGN PATENT DOCUMENTS

| | | |
|---|---|---|
| EP | 372 561 | 6/1990 |
| EP | 676 403 B1 | 9/1999 |
| WO | WO 9213018 A1 * | 8/1992 |

OTHER PUBLICATIONS

Adhesives Age, Apr. 1995, Dr. Ta-Min Feng et al, p. 30-32, "Silylated Urethane Polymers Enhance Properties of Construction Sealants".

* cited by examiner

*Primary Examiner*—Marc S Zimmer
*Assistant Examiner*—Noah Frank
(74) *Attorney, Agent, or Firm*—Robert S. Klemz; Noland J. Cheung

(57) ABSTRACT

The present invention relates to modified alkoxysilane-functional polyurethanes containing allophanate and/or biuret groups, wherein at least 10 mol % of the allophanate and/or biuret groups are formed from a monoisocyanate of the formula R—NCO, wherein R is an optionally heteroatom-containing alkyl, aralkyl or aryl radical having up to 20 carbon atoms, provided that these radicals do not contain any other reactive groups with the exception of the NCO group that is part of the allophanate structure and any alkoxysilyl groups present. The present invention also relates to a process for preparing alkoxysilane-functional prepolymers by A) reacting some or all of the urethane groups and/or urea groups of alkoxysilane-functional polyurethane prepolymers with monoisocyanates of the formula, R—NCO to form allophanate groups and/or biuret groups, or B) reacting some or all urethane groups and/or urea groups of alkoxysilyl-free polyurethane prepolymers with monoisocyanates of the formula R—NCO to form allophanate groups and/or biuret groups, the radical R having at least one alkoxysilyl group.

The present invention further relates to sealants, adhesives, primers and coatings based on the polyurethane prepolymers of the invention.

11 Claims, No Drawings

POLYURETHANE PREPOLYMERS CONTAINING ALKOXYSILANE GROUPS AND ALLOPHANATE AND/OR BIURET GROUPS

BACKGROUND OF THE INVENTION

1. Field of the Invention

The present invention relates to alkoxysilane-functional prepolymers which have been modified to contain allophanate and/or biuret groups having at least one silane-functional or non-functional alkyl or aryl radical, to a process for preparing these prepolymers and to adhesives, sealants, primers or coatings prepared from these prepolymers.

2. Description of Related Art

Alkoxysilane-functional polyurethanes which crosslink via silane polycondensation are well established. A review article on this topic is found for example in "Adhesives Age" 4/1995, page 30 ff. (authors: Ta-Min Feng, B. A. Waldmann). Alkoxysilane-terminated, moisture-curing, one-component polyurethanes are increasingly being used as elastomeric coating, sealing and adhesive compositions in construction and in the automotive industry.

These alkoxysilane-functional polyurethanes can be prepared in accordance with U.S. Pat. No. 3,627,722 or U.S. Pat. No. 3,632,557 by reacting, for example, polyether polyols with an excess of polyisocyanate to form an NCO-containing prepolymer which is then further reacted with an amino-functional alkoxysilane. The resulting alkoxysilane-functional prepolymer contains a high concentration of urea groups and urethane groups, which results in products having high viscosities.

One effective way of reducing at least the portion of the hydrogen bond density resulting from the urea groups is to use secondary aminosilanes to generate substituted ureas. A variety of methods have been proposed for this purpose: U.S. Pat. No. 3,627,722 and U.S. Pat. No. 3,632,557 use alkyl-substituted aminosilanes; U.S. Pat. No. 4,067,844 uses an addition reaction of acrylates with the primary aminosilane; EP-A 596 360 uses an addition reaction of maleic esters with the primary aminosilane; and EP-A 676 403 introduces aryl-substituted aminosilanes. All of these methods, however, are able to replace only one hydrogen atom on the terminal urea group; all other urea protons and urethane protons continue to contribute, via hydrogen bonds, to a high viscosity.

Another appropriate way of reducing the density of the hydrogen bonds and, thus, the viscosity is disclosed in EP-A 372 561, in which very long chain polyether polyols are used with a low level of molecular weight increase through the reaction with the polyisocyanate. This requires polyethers which by virtue of specific preparation processes have a high functionality in conjunction with a low level of unsaturation and polydispersity. Further aspects of this technology are described in WO 99/48942 and WO 00/26271. However, this principle has a significant effect only in the case of very long chain prepolymers, designed for low-modulus binders, and even then it is only possible to eliminate some of the hydrogen bond density.

U.S. Pat. No. 4,345,053 teaches another possibility for reducing the urethane density and, thus, the hydrogen bond density by terminating an OH-functional prepolymer with an isocyanate-functional alkoxysilane, which theoretically saves one urea group per termination. However, the OH-functional prepolymer still contains urethane groups resulting from the reaction of a polyether polyol with diisocyanate. These groups, as also disclosed in EP-A 372 561, can be reduced by using specially prepared long-chain polyethers with a low level of unsaturation and polydispersity. Disadvantages of this approach are that 1) the isocyanatosilanes needed for this purpose are compounds of low availability, which are therefore expensive, 2) the compounds have a tendency to undergo side reactions with the OH groups of the polyethers, and 3) here again only some of the viscosity-increasing urethane groups can be eliminated.

The fact that polyisocyanates with allophanate groups have a relatively low viscosity as compared with their non-allophanate counterparts is known in the literature, for example in EP-B 0 682 012.

In the art they are prepared by reacting a monohydric or polyhydric alcohol with large amounts of excess aromatic, aliphatic and/or cycloaliphatic diisocyanate (cf. GB-A 994 890, U.S. Pat. No. 3,769,318, EP-A 0 000 194 or EP-A 0 712 840). There exclusively di- or polyisocyanates are used, in order to obtain in turn an isocyanate-functional binder. To prevent premature crosslinking it is necessary to use an excess of polyisocyanate, which, after urethanization and allophanatization have taken place, must be removed by means of vacuum distillation. With this approach, a further isocyanate functional group is linked via the allophanate nitrogen.

It is also possible to prepare allophanates indirectly from isocyanate derivatives other than urethanes and isocyanates. EP-A 0 825 211 describes a process for preparing allophanate groups from oxadiazinetriones; another possibility is the opening of uretdiones (cf. Proceedings of the International Waterborne, High-Solids, and Powder Coatings Symposium 2001, $28^{th}$, 405-419 and also US-A 2003 0153713) to allophanate groups. Both of these pathways, however, require refined starting materials and lead only to an allophanate product which is rich in by-products. Additionally, the precursors are constructed using exclusively at least difunctional polyisocyanates.

The use of monoisocyanates has already been disclosed in connection with allophanate chemistry. Applications U.S. Pat. No. 5,663,272 and U.S. Pat. No. 5,567,793 use phenyl isocyanate in order to acquire, by reaction with a polyfunctional alcohol, an NCO- and OH-free urethane, which is subsequently modified by allophanatization with specific MDI grades to give a liquid MDI polyisocyanate. In this approach the product contains monomeric diisocyanate prior to further processing.

It is an object of the present invention to provide modified, alkoxysilane-functional polyurethane prepolymers having a significantly reduced viscosity compared with the prior art.

It has now been found that these prepolymers can be prepared very easily by reacting the urethane groups and/or urea groups of a polyurethane prepolymer, which may contain alkoxysilane groups, with monoisocyanates, the reaction involving partial or complete allophanatization and/or biuretization of these groups. The monoisocyanate may itself contain alkoxysilane groups, so that silane-modified prepolymers can also be obtained from alkoxysilane-free polyurethane prepolymers.

SUMMARY OF THE INVENTION

The present invention relates to modified alkoxysilane-functional polyurethanes containing allophanate and/or biuret groups, wherein at least 10 mol % of the allophanate and/or biuret groups are formed from a monoisocyanate of the formula R—NCO, wherein R is an optionally heteroatom-containing alkyl, aralkyl or aryl radical having up to 20 carbon atoms, provided that these radicals do not contain any other reactive groups with the exception of the NCO group that is part of the allophanate structure and any alkoxysilyl groups present.

The present invention also relates to a process for preparing alkoxysilane-functional prepolymers by A) reacting some or all of the urethane groups and/or urea groups of alkoxysilane-functional polyurethane prepolymers with monoisocyanates of the formula, R—NCO to form allophanate groups and/or biuret groups, or B) reacting some or all urethane groups and/or urea groups of alkoxysilyl-free polyurethane prepolymers with monoisocyanates of the formula R—NCO to form allophanate groups and/or biuret groups, the radical R having at least one alkoxysilyl group.

The present invention further relates to sealants, adhesives, primers and coatings based on the polyurethane prepolymers of the invention.

DETAILED DESCRIPTION OF THE INVENTION

The allophanate-functional compounds are obtained by reacting any desired urethane- and/or urea-functional starting compounds or prepolymers with monoisocyanates of the formula R—NCO, wherein R is preferably an alkyl, aralkyl or aryl radical having up to 20 carbon atoms wherein the radical optionally contains halogen, N, O or Si heteroatoms, more preferably an alkyl radical having 1 to 20 carbon atoms optionally containing at least one alkoxysilyl group or an aryl radical having 6 to 20 carbon atoms optionally containing at least one alkoxysilyl group.

Suitable monoisocyanates R—NCO include non-functional monoisocyanates and also functional isocyanates which besides the NCO function additionally carry at least one alkoxysilyl group.

Suitable non-functional monoisocyanates include aromatic, aliphatic and cycloaliphatic monoisocyanates having up to 20 carbon atoms, such as methyl isocyanate, isopropyl isocyanate, n-butyl isocyanate, n-hexyl isocyanate, cyclohexyl isocyanate, stearyl isocyanate, the optionally halogenated phenyl isocyanates, 1-naphthyl isocyanate, the optionally chlorinated or fluorinated m-, o-, and p-tolyl isocyanates, p-isopropylphenyl isocyanate, 2,6-diisopropylphenyl isocyanate, and p-toluenesulphonyl diisocyanate.

Preferred non-functional monoisocyanates are butyl isocyanate and hexyl isocyanate.

Also suitable are polyisocyanates in which all but one of the NCO groups have been reacted with an NCO-reactive compound, although these compounds are not preferred.

Suitable alkoxysilane-functional monoisocyanates include isocyanatomethyl-trimethoxysilane, isocyanatonfethyltriethoxysilane, (isocyanatomethyl)methyldimethoxysilane, (isocyanatomethyl)methyl-diethoxysilane, 3-isocyanatopropyltrimethoxysilane, 3-isocyanatopropylmethyl-dimethoxysilane, 3-isocyanatopropyltriethoxysilane and 3-isocyanatopropylmethyl-diethoxysilane. Preferred is 3-isocyanatopropyltrimethoxysilane.

Also suitable are isocyanate-functional silanes prepared by reacting a diisocyanate with an aminosilane or thiosilane, although these compounds are not preferred.

The monoisocyanate used for allophanatization may be used in a substoichiometric, equimolar or excess amount, based on the urethane and urea groups present in the starting compound. In the latter case it is necessary for the excess monoisocyanate to be separated off when reaction is complete by known methods, such as distillation or extraction. It is preferred to use 0.1 to 1.0 mole, more preferably 0.5 to 1.0 mole of monoisocyanate, for each 1.0 mole of urethane groups and urea groups in the starting compound.

The allophanatization and/or biuretization of the urethane and/or urea groups by the monoisocyanates is carried out preferably using catalysts. Suitable allophanatizing or biuretizing catalysts are known and include zinc-salts, such as zinc octoate, zinc acetylacetonate and zinc 2-ethylcaproate; or tetraalkylammonium compounds, such as N,N,N-trimethyl-N-2-hydroxy propylammonium hydroxide, N,N,N-trimethyl-N-2-hydroxy propylammonium 2-ethylhexanoate or choline 2-ethylhexanoate. Preferred are zinc octoate (zinc 2-ethylhexanoate) and the tetraalkylammonium compounds, more preferably zinc octoate.

The catalyst is used in amounts of 0.001% to 5.0% by weight, preferably 0.01% to 1.0% by weight and more preferably 0.05% to 0.5% by weight, based on the solids content of the product of the process.

The allophanatizing catalyst can be added in one portion, in several portions or continuously. It is preferred to add the whole amount in one portion. It is also possible to place the allophanatizing catalyst on support materials by known methods and to use it in the form of a heterogeneous catalyst.

In the preferred embodiment where the monoisocyanate used for allophanatization/biuretization reaction is employed in a substoichiometric or equimolar amount, based on the urethane/urea groups present in the starting compound, it is preferred to conduct the allophanatization reaction until the NCO content of the product is below 1.0% by weight, more preferably below 0.5% by weight. For the less preferred case where the monoisocyanate employed for the allophanatization reaction is used in excess over the urethane/urea groups present in the starting compound, it is possible to use an NCO-containing starting compound and to conduct the allophanatization reaction until the desired NCO content of the target compound is achieved. In that case it is necessary to separate the excess monoisocyanate following complete reaction, by a method known to the skilled person, such as distillation or extraction.

It is also possible to react a residual NCO group content with NCO-reactive compounds, such as alcohols, after the end of modification reaction. This gives products having especially low NCO contents.

The allophanatization and/or biuretization essential to the invention is carried out at temperatures of 20 to 200° C., preferably 20 to 120° C., more preferably 40 to 100° C.

The process of the invention may be carried out continuously in a static mixer, extruder or compounder, for example, or batchwise in a stirred reactor, for example. The process of the invention is preferably carried out in a stirred reactor.

The course of the reaction can be monitored in known manner by suitable measuring instruments installed in the reaction vessel and/or by analyses of samples taken. Examples include viscosity measurements, measurements of NCO content, measurements of refractive index, measurements of OH content, gas chromatography (GC), nuclear magnetic resonance (NMR) spectroscopy, infrared (IR) spectroscopy and near-infrared (NIR) spectroscopy. Preferably, IR monitoring is used for existing free NCO groups (for aliphatic NCO groups, band at about $v=2272$ cm$^{-1}$) and GC analysis is used for unreacted NCO groups.

Preferably at least 20 mol %, more preferably at least 40 mol %, of the allophanate and/or biuret groups present in the compounds of the invention are based on monoisocyanates R—NCO.

Suitable starting materials containing urethane groups and/or urea groups include all compounds which have at least one urethane group or urea group per molecule. Compounds containing urethane groups are customarily obtained by reacting isocyanate-functional compounds with polyols in an optionally catalyzed addition reaction. Polymers containing urea groups are commonly prepared by reacting NCO groups with amino groups.

Suitable isocyanate-functional compounds include aromatic, aliphatic and cycloaliphatic polyisocyanates having a number average molecular weight of below 800 g/mol. Examples include 2,4- and/or 2,6-toluene diisocyanate (TDI), methylenediphenyl diisocyanate (MDI), triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanate=IPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 2,2-bis(4-isocyanatocyclo-hexyl)propane, 3-isocyanatomethyl-1-methyl-1-isocyanatocyclohexane (MCI), 1,3-diisooctylcyanato-4-methylcyclohexane, 1,3-diisocyanato-2-methylcyclohexane, α,α,α',α'-tetramethyl-m- or -p-xylylene diisocyanate (TMXDI) and mixtures of these compounds.

Preferred starting materials for preparing the compounds containing urethane groups are hexamethylene diisocyanate (HDD, isophorone diisocyanate (IPDI) and/or 4,4'-diisocyanatodicyclohexylmethane.

Also suitable as isocyanate-containing compounds are reaction products of the preceding monomeric isocyanates with themselves or with one another to form polyisocyanate adducts containing uretdione groups or isocyanurate groups. Examples include Desmodur® N3300, Desmodur® N3400 or Desmodur® N3600 (all from Bayer MaterialScience, Leverkusen, Del.). Additionally suitable are polyisocyanate adducts containing allophanate groups or biuret groups. Examples include Desmodur® N100, Desmodur® N75MPA/BA or Desmodur® VPLS2102 (all from Bayer MaterialScience, Leverkusen, Del.).

In accordance with the teachings of German Patent Application DE 10 200-40 488 73, unpublished at the priority date of the present specification, functionalized allophanates can also be prepared by a process in which isocyanates in a one-pot reaction are first urethanized with a substoichiometric amount of a hydroxy-functional compound and then in a further step are reacted with an allophanatizing catalyst to form allophanates. In this case it is conceivable to subsequently carry out the inventive modification. Preferred in this case, however, is a process of adding the monoisocyanate (prior to the second step and after the conclusion of urethanization) to the reaction mixture and carrying out the process of the present invention in parallel with the allophanatization in accordance with German Patent Application DE 10 200 40 488 73.

The isocyanates may also be compounds which by reaction with water (hydrolysis) liberate chlorine or chloride (compounds containing hydrolyzable chlorine). In the process of the invention such compounds can lead to clouding of the resin and to an unnecessarily high consumption of catalyst. It is therefore preferred to use isocyanates containing less than 1000 ppm, preferably less than 500 ppm, and more preferably less than 200 ppm, of hydrolyzable chlorine.

For the urethanization it is possible to use low and/or high molecular weight polyols. The low molecular weight polyhydroxyl compounds include the known polyols from polyurethane chemistry having molecular weights of 62 to 399 g/mol, such as ethylene glycol, triethylene glycol, tetraethylene glycol, propane-1,2- and -1,3-diol, butane-1,4- and -1,3-diol, hexane-1,6-diol, octane-1,8-diol, neopentyl glycol, 1,4-bis(hydroxymethyl)cyclohexane, bis(hydroxymethyl)tricyclo[5.2.1.0$^{2,6}$]decane or 1,4-bis(2-hydroxyethoxy)benzene, 2-methyl-1,3-propanediol, 2,2,4-trimethylpentanediol, 2-ethyl-1,3-hexanediol, dipropylene glycol, polypropylene glycols, dibutylene glycol, polybutylene glycols, bisphenol A, tetrabromobisphenol A, glycerol, trimethylolpropane, hexane-1,2,6-triol-butane-1,2,4-triol, pentaerythritol, quinitol, mannitol, sorbitol, methylglycoside and 4,3,6-dianhydrohexitols.

High molecular hydroxyl compounds include the hydroxy polyesters, hydroxy polyethers, hydroxy polytlioethers, hydroxy polyacetals, hydroxy polycarbonates, dimer fatty alcohols and/or esteramides that are known from polyurethane chemistry and have number average molecular weights of 400 to 20,000 g/mol, preferably 2000 to 18,000 g/mol.

Preferred high molecular weight polyhydroxyl compounds are hydroxy polyethers, hydroxy polyesters and hydroxy polycarbonates.

Suitable polyether polyols are the polyethers known from polyurethane chemistry and include the adducts or coadducts of tetrahydrofuran, styrene oxide, ethylene oxide, propylene oxide, butylene oxides or epichlorohydrin, particularly ethylene oxide and/or propylene oxide, that are prepared using dihydric to hexahydric starter molecules such as water or the previously mentioned polyols or amines having 1- to 4-NH bonds. Preferred are propylene oxide polyethers which have an average of 2 to 4 hydroxyl groups and can contain up to 50% by weight of incorporated polyethylene oxide units. The polyethers may be prepared by catalysis with potassium hydroxide, for example, and also polyethers prepared by the more recent processes based on double metal cyanide catalysts. The latter polyethers generally have a particularly low level of terminal unsaturation of less than 0.07 meq/g, contain a significantly lower proportion of monols and generally have a low polydispersity of less than 1.5. Preferred polyethers are those prepared by double metal cyanide catalysis.

Examples of suitable polyester polyols include reaction products of polyhydric, preferably dihydric and optionally trihydric alcohols with polybasic, preferably dibasic, carboxylic acids. In place of the free polycarboxylic acids it is also possible to use the corresponding polycarboxylic anhydrides or corresponding polycarboxylic esters of lower alcohols or mixtures thereof to prepare the polyesters. Suitable alcohols include those previously mentioned for conducting the urethanization according to the invention. The polycarboxylic acids may be aliphatic, cycloaliphatic, aromatic and/or heterocyclic in nature and may optionally be substituted, by halogen atoms, for example, and/or unsaturated. Examples of suitable acids include adipic acid, phthalic acid, isophthalic acid, succinic acid, suberic acid, azelaic acid, sebacic acid, trimellitic acid, phthalic anhydride, tetrahydrophthalic anhydride, glutaric anhydride, tetrachiorophthalic anhydride, endomethylene tetrahydrophthalic anhydride, maleic anhydride, maleic acid, fumaric acid, dimeric and trimeric fatty acids (such as oleic acid, optionally in a mixture with monomeric fatty acids), dimethyl terephthalate or bisglycol terephthalate. Preferred are hydroxy polyesters which melt below 60° C. and have 2 or 3 terminal OH groups.

Suitable polycarbonate polyols include those obtained by reacting carbonic acid derivatives, such as diphenyl carbonate, dimethyl carbonate or phosgene, with diols. Examples of suitable diols include ethylene glycol, triethylene glycol, tetraethylene glycol, propane-1,2- and -1,3-diol, butane-1,4- and -1,3-diol, pentane-1,5-diol, hexane-1,6-diol, octane-1,8-diol, neopentyl glycol, 1,4-bis(hydroxy-methyl)cyclohexane, bis(hydroxymethyl)tricyclo[5.2.1.0$^{2,6}$]decane or 1,4-bis (2-hydroxyethoxy)benzene, 2-methyl-1,3-propanediol, 2,2, 4-trimethylpentanediol, dipropylene glycol, polypropylene glycols, dibutylene glycol, polybutylene glycols, bisphenol A, tetrabromobisphenol A or mixtures thereof.

Preferably the diol component contains 40% to 100% by weight of hexanediol, preferably hexane-1,6-diol, and/or its derivatives, preferably those which contain terminal OH groups and ether groups or ester groups. Examples include products obtained by reacting 1 mole of hexanediol with at least one 1 mole, preferably 1 to 2 moles, of caprolactone in accordance with DE-A 1 770 245, or products obtained by etherifying hexanediol with itself to form the di- or trihexylene glycol. The preparation of these derivatives is known, for example, from DE-A 1 570 540. The polyether-polycarbonate diols described in DE-A 3 717 060 can also be used.

The hydroxy polycarbonates are preferably substantially linear. However they may also be branched to a slight degree through the incorporation of polyfunctional components, especially low molecular weight polyols. Examples include trimethylolpropane, hexane-1,2,6-triol, glycerol, butane-1,2,4-triol, pentaerythritol, quinitol, mannitol, sorbitol, methylglycoside and 4,3,6-dianhydrohexitols.

The preparation of the alkoxysilane-functional prepolymers required in embodiment A) is known and described, for example, in U.S. Pat. No. 3,632,557, EP-A 372 561, EP-A 931 800 or WO 00/26271.

In one embodiment an NCO-functional prepolymer is initially prepared from the abovementioned components at an NCO/OH equivalent ratio of 1.2:1 to 2.0:1 and then the prepolymer is reacted with an isocyanate-reactive functional alkoxysilane. In a second embodiment an OH-functional prepolymer is prepared at an NCO/OH equivalent ratio of 1:1.2 to 1:2, which is then reacted with an isocyanate-functional silane component. In a third embodiment a polyol is functionalized using an isocyanate-functional silane component without the prior reaction with a diisocyanate.

Suitable isocyanate-reactive silane compounds are known and include aminopropyltrimethoxysilane, mercaptopropyltrimethoxysilane, aminopropyl-methyldimethoxysilane, mercaptopropylmethyldimethoxysilane, aminopropyl-triethoxysilane, mercaptopropyltriethoxysilane, aminopropylmethyldiethoxysilane, mercaptopropylmethyldiethoxysilane, aminomethyltrimethoxysilane, aminomethyltriethoxysilane, (aminomethyl)methyldimethoxysilane, (aminomethyl)methyl-diethoxysilane, N-butylaminopropyltrimethoxysilane, N-ethylaminopropyltrimethoxysilane, N-phenylaminopropyltrimethoxysilane, N-(3-triethoxysilyl-propyl)aspartic acid diethyl ester, N-(3-trimethoxysilylpropyl)aspartic acid diethyl ester and N-(3-dimethoxymethylsilylpropyl)aspartic acid diethyl ester. Preferred are N-(3-trimethoxysilyl-propyl)aspartic acid diethyl ester and aminopropyl trimethoxysilane.

The preparation of the non-functional prepolymers required in embodiment B) is less preferred than embodiment A). In this case it is possible both for NCO-functional prepolymers prepared from the aforementioned compounds to be capped by monoalcohols, and for OH-functional polyols or prepolymers to be capped by monoisocyanates. In this embodiment of the process of the invention it is necessary, in order to introduce alkoxysilane groups, to carry out the allophanatization with a silane-functional monoisocyanate R—NCO.

In accordance with both variants of the process of the invention for each mole of urethane groups and urea groups in the corresponding prepolymers, 0.1 mole to 1.0 mole, preferably 0.3 moles to 0.9 moles of non-functional or silane-functional monoisocyanates are added. The allophanatization and/or biuretization is then carried out optionally in the presence of an allophanatizing catalyst at 60° C. to 160° C., preferably 80° C. to 120° C. The sequence of addition of the components in this case is not critical. To complete the allophanatization and/or biuretization reaction, the batch is stirred until the desired NCO content has been reached in the end product. It is preferred to carry out the allophanatization reaction until the NCO content of the product is below 1.0% by weight, more preferably below 0.5% by weight.

The compounds of the invention are highly suitable as binders for producing isocyanate-free, low modulus polyurethane sealants, preferably for the construction sector. These sealants crosslink on exposure to atmospheric moisture via a silanol polycondensation. Additionally, they are suitable for producing adhesives, primers and coatings.

To prepare such sealants or adhesives it is possible to formulate the polyurethane prepolymers of the invention, which have alkoxysilane end groups, together with known additives such as plasticizers, fillers, pigments, dryers, additives, light stabilizers, antioxidants, thixotropic agents, catalysts and adhesion promoters by known methods of production.

Suitable fillers include carbon black, precipitated silicas, pyrogenic silicas, mineral chalks and precipitated chalks. Suitable plasticizers include phthalic esters, adipic esters, alkylsulphonic esters of phenol, or phosphoric esters. Suitable thixotropic agents include pyrogenic silicas, polyamides, hydrogenated castor oil derivatives or polyvinyl chloride. Suitable catalysts for curing include organotin compounds and amine catalysts. Examples of organotin compounds include dibutyltin diacetate, dibutyltin dilaurate, dibutyltin bisacetoacetonate and tin carboxylates such as tin octoate. These tin catalysts can optionally be used optionally in combination with amine catalysts such as aminosilanes or diazabicyclooctane.

Suitable dryers include alkoxysilyl compounds such as vinyltrimethoxysilane, methyltrimethoxysilane, isobutyltrimethoxysilane and hexadecyltrimethoxysilane. Adhesion promoters include the known functional silanes such as the previously mentioned aminosilanes and also N-aminoethyl-3-aminopropyltrimethoxy and/or N-aminoethyl-3-aminopropylmethyldimethoxysilane, epoxysilanes and/or mercaptosilanes.

The crosslinked polymers are noted for outstanding extensibility in conjunction with a low modulus. At the same time, for a given polymer molecular weight, a fall in NCO/OH ratio is observed to be accompanied by a decrease in the modulus and in the Shore hardness and also by an increase in the breaking extension.

The invention is further illustrated but is riot intended to be limited by the following examples in which all parts and percentages are by weight unless otherwise specified.

EXAMPLES

The determination of the NCO contents in % was performed by back-titration with 0.1 mol/l hydrochloric acid following reaction with butylamine in accordance with DIN EN ISO 11909.

The viscosity measurements were conducted at 23° C. using a plate/plate rotational viscometer, RotoVisko 1 from Haake, Del., in accordance with ISO/DIS 3219:1990.

The ambient temperature of 23° C. prevailing at the time when the experiments were conducted is designated RT.

Starting Prepolymer A and Comparative Example to Examples 1 and 2

874 g of a polypropylene glycol having an OH number of 14.1 (Acclaim® 8200N, Bayer MaterialScience AG, Leverkusen) were dried at 120° C. under reduced pressure (low nitrogen transit rate) for six hours. Then prepolymerization was carried out with 45.2 g of isophorone diisocyanate (Bayer MaterialScience AG, Leverkusen, Del.) (index 1.85) at 60° C. with the addition of 50 ppm of dibutyltin dilaurate (Desmorapid Z®, Bayer MaterialScience AG, Leverkusen, Del.) until the theoretical NCO content of 0.85% was reached. Subsequently at 60° C. 65.8 g of N-(3-trimethoxysilylpropyl)aspartic acid diethyl ester (prepared in accordance with EP-A 596 360, Ex. 5) were added rapidly dropwise and the mixture was stirred until an isocyanate band was no longer visible in the IR spectrum. The resulting polyurethane prepolymer contained alkoxysilyl end groups and had a viscosity of 51,000 mPa·s (23° C.).

Example 1

Inventive Allophanate- and Biuret-Containing Binder 985 g of silane-terminated prepolymer A were initially admixed at 60° C. with 21.8 g of butyl isocyanate (Lanxess, Leverkusen, hydrolyzable chlorine content approximately 100 ppm) and then 2.0 g of zinc-octoate (zinc 2-ethylhexanoate, Octa-Soligen Zink 22, Borchers, Monheim, Del.) and the mixture was heated further at 100° C. After 5 h a residual NCO content of only 0.04% was detected and the reaction was terminated. This resulting prepolymer contained silane groups and allophanatization groups and had a viscosity of 29,500 mPa·s (23° C.).

Example 2

Inventive Allophanate- and Biuret-Containing Binder 1036 g of silane-terminated prepolymer A were initially admixed at 60° C. with 50.3 g of isocyanatopropyltrimethoxysilane (A-link 35®, GE Advanced Materials, Wilton, Conn., USA) and then 2.1 g of zinc octoate (zinc 2-ethylhexanoate, Octa-Soligen Zink 22, Borchers, Monheim, Del.) and the mixture was heated further at 100° C. After 5 h a residual NCO content of only 0.08% was detected and the reaction was terminated. This resulting prepolymer contained silane groups and allophanatization groups and had a viscosity of 20,500 mPa·s (23° C.).

Starting Prepolymer B and Comparative Example to Example 3

874 g of a polypropylene glycol having an OH number of 14.1 (Acclaim® 8200N, Bayer MaterialScience AG, Leverkusen, Del.) were dried at 120° C. under reduced pressure (low nitrogen transit rate) for six hours. Then prepolymerization was carried out with 45.2 g of isophorone diisocyanate (Bayer MaterialScience AG, Leverkusen) (index 1.85) at 60° C. with the addition of 50 ppm of dibutyltin dilaurate (Desmorapid Z®, Bayer MaterialScience AG, Leverkusen, Del.) until the theoretical NCO content of 0.85% was reached. Subsequently at 60° C. 33.5 g of aminopropyl-trimethoxysilane (A-1110®, GE Advanced Materials, Wilton, Conn., USA) were added rapidly dropwise and the mixture was stirred until an isocyanate band was no longer visible in the IR spectrum. The resulting polyurethane prepolymer contained alkoxysilane end groups and had a viscosity of 150,000 mPa·s (23° C.).

Example 3

Inventive Allophanate- and Biuret-Containing Binder

Silane-terminated prepolymer B was admixed at 60° C. with 21.8 g of butyl isocyanate and then 2.0 g of zinc octoate and the mixture was heated further at 100° C. After 5 h a residual NCO content of only 0.05% was detected and the reaction was terminated. The resulting prepolymer contained silane groups, allophanate groups and biuret groups and had a viscosity of 72,000 mPa·s (23° C.).

Example 4

Inventive Allophanate-Containing Binder 914 g of a polypropylene glycol having an OH number of 14.1 (Acclaim® 8200N, Bayer MaterialScience AG, Leverkusen) were dried at 120° C. under reduced pressure (low nitrogen transit rate) for six hours. Then prepolymerization was carried out with 47.2 g of isophorone diisocyanate (Bayer MaterialScience AG, Leverkusen, Del.) (index 1.85) at 60° C. with the addition of 50 ppm of dibutyltin dilaurate (Desmorapid Z®, Bayer MaterialScience AG, Leverkusen, Del.) until the theoretical NCO content of 0.85% was reached. Subsequently at 60° C. 14.47 g of 1-butanol were added rapidly dropwise and the mixture was stirred until an isocyanate band was no longer visible in the IR spectrum. The resulting, non-functional polyurethane prepolymer was initially admixed at 60° C. with 50.31 g of isocyanatopropyltrimethoxysilane (A-link 35®, GE Advanced Materials, Wilton, Conn., USA) and then 1.0 g of zinc octoate (zinc 2-ethylhexanoate, Octa-Soligen Zink 22, Borchers, Monheim, Del.) and the mixture was heated further at 100° C. After 5 h a residual NCO content of only 0.12% was detectable and the reaction was terminated. This resulting prepolymer contained silane groups and allophanate groups and had a viscosity of 57,700 mPa·s (23° C.).

Example 5

Inventive Allophanate-Containing Binder 933 g of a polypropylene glycol having an OH number of 9.6 (Acclaim® 12200N, Bayer MaterialScience AG, Leverkusen) were dried at 120° C. under reduced pressure (low nitrogen transit rate) for six hours. Then reaction was carried out with 15.84 g of butyl isocyanate at 60° C. with the addition of 50 ppm of dibutyltin dilaurate (Desmorapid Z®, Bayer MaterialScience AG, Leverkusen, Del.) until the NCO groups were completely reacted. The resulting, non-functional polyurethane prepolymer was initially admixed at 60° C. with 38.5 g of isocyanatopropyl-trimethoxysilane (A-link 35®, GE Advanced Materials, Wilton, Conn., USA) and then 1.0 g of zinc octoate (zinc 2-ethylhexanoate, Octa-Soligen Zink 22, Borchers, Monheim, Del.) and the mixture was heated further at 100° C. After 10 h a residual NCO content of only 0.06% was detected, which was removed completely by adding 0.5 g of methanol and stirring for two hours. The resulting prepolymer contained silane groups and allophanate groups and had a viscosity of 11,200 mPa·s (23° C.).

Example 6

Inventive Allophanate-Containing Binder 507.2 g of a polypropylene glycol having an OH number of 28 (Acclaim® 4200, Bayer MaterialScience AG, Leverkusen) were dried at 120° C. under reduced pressure (low nitrogen transit rate) for six hours. Then reaction was carried out with 14.07 g of isophorone diisocyanate at 80° C. with the addition of 200 ppm of dibutyltin dilaurate (Desmorapid Z®, Bayer MaterialScience AG, Leverkusen, Del.) until the NCO groups were completely reacted. The resulting, OH-functional polyurethane prepolymer were admixed at 80° C. with 77.41 g of isocyanatopropyl-trimethoxysilane (A-link 35®, GE Advanced Materials, Wilton, Conn., USA) and the mixture was stirred until the NCO content was 1.1%. Then 1.2 g of zinc octoate (zinc 2-ethylhexanoate, Octa-Soligen Zink 22, Borchers, Monheim, Del.) were added and the mixture was heated further at 1000° C. After 6 h there was no residual NCO content was detected. The resulting prepolymer contained silane groups and allophanate groups and had a viscosity of 15,000 mPa·s (23° C.).

SUMMARY

| Ex. | Prepolymer capping | Viscosity without modification | Monoisocyanate | Viscosity with modification |
|---|---|---|---|---|
| 1 | NCO prepolymer + aminosilane | 51,000 mPa · s | butyl isocyanate | 29,500 mPa · s |
| 2 | NCO prepolymer + aminosilane | 51,000 mPa · s | isocyanatosilane | 20,500 mPa · s |
| 3 | NCO prepolymer + aminosilane | 150,000 mPa · s | butyl isocyanate | 72,000 mPa · s |
| 4 | NCO prepolymer + butanol | no STP | isocyanatosilane | 57,700 mPa · s |
| 5 | Polyether + butyl isocyanate | no STP | isocyanatosilane | 11,200 mPa · s |
| 6 | OH-terminated prepolymer + isocyanatosilane | in situ reaction | isocyanatosilane | 15,000 mPa · s |

Examples 1 to 3 show clearly the viscosity advantage achievable through the additional allophanatization. In the case of Example 2 additional silane groups are incorporated. Examples 4 and 5 show new synthesis routes to silane-terminated prepolymers which are not possible without forming allophanate groups. Example 6 shows capping an OH prepolymer with an excess of an isocyanatosilane and immediate subsequent allophanatization with isocyanatosilane. In the case of Examples 4 to 6 it is not possible to report the viscosity of the STP prior to modification, since the silane functionality is only incorporated as a result of the allophanate modification.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An alkoxysilane-functional polyurethane containing allophanate and/or biuret groups wherein at least 10 mol % of the allophanate and/or biuret groups are formed from a monoisocyanate of the formula R—NCO, wherein R is an optionally heteroatom-containing alkyl, aralkyl or aryl radical having up to 20 carbon atoms, provided that these radicals do not contain any other reactive groups with the exception of the NCO group that is part of the allophanate structure and any alkoxysilyl groups present, wherein the NCO content of the polyurethane is below 1.0% by weight, and wherein the monoisocyanate comprises silane functionality.

2. The alkoxysilane-functional polyurethane of claim 1 wherein at least 40 mol % of the allophanate and/or biuret groups are formed from a monoisocyanate of the formula R—NCO.

3. The alkoxysilane-functional polyurethane of claim 2 wherein said monoisocyanate comprises 3-isocyanatopropyl-trimethoxysilane.

4. The alkoxysilane-functional polyurethane of claim 1 wherein said monoisocyanate comprises 3-isocyanatopropyl-trimethoxysilane.

5. A process for preparing the alkoxysilane-functional prepolymer of claim 1 which comprises
　A) reacting some or all urethane groups and/or urea groups of an alkoxysilyl-free polyurethane prepolymer with a monoisocyanate of the formula R—NCO to form allophanate groups and/or biuret groups, wherein the radical R has at least one alkoxysilyl group until the prepolymer has an NCO content of less than 1.0% by weight.

6. The process of claim 5 wherein process B) is used and said monoisocyanate comprises 3-isocyanatopropyltrimethoxysilane.

7. The process of claim 6 wherein 0.1 to 1.0 mole of the monoisocyanate is used for each mole of urethane groups and/or urea groups present in the polyurethane prepolymer.

8. The process of claim 5 which comprises carrying out the process in the presence of a catalyst.

9. The process of claim 5 wherein the catalyst comprises zinc octoate, zinc 2-ethylhexanoate or a tetraalkylammonium compound.

10. The process of claim 5 wherein 0.1 to 1.0 mole of the monoisocyanate is used for each mole of urethane groups and/or urea groups present in the polyurethane prepolymer.

11. A coating, primer, adhesive or sealant prepared from the alkoxysilane-functional polyurethane of claim 1.

* * * * *